United States Patent [19]

Kozinski

[11] 3,879,066

[45] Apr. 22, 1975

[54] AIR BRAKE HOSE COUPLING MEMBER CONSTRUCTION

[76] Inventor: Richard R. Kozinski, 2205 Dunkerth Dr., N.W., Canton, Ohio 44708

[22] Filed: Dec. 20, 1973

[21] Appl. No.: 427,025

[52] U.S. Cl.................................. 285/69; 285/87
[51] Int. Cl......................... F16l 35/00; B60d 1/08
[58] Field of Search............ 285/69, 68, 87, 88, 76, 285/74

[56] References Cited
UNITED STATES PATENTS

| | | | |
|---|---|---|---|
| 873,892 | 12/1907 | Petterson........................... | 285/87 |
| 1,525,794 | 2/1925 | Blake................................ | 285/87 X |
| 2,315,981 | 4/1943 | Olson................................ | 285/87 X |
| 2,687,221 | 8/1954 | Turner............................... | 285/87 X |
| 2,689,140 | 9/1954 | Bonacci............................. | 285/69 |
| 3,023,031 | 2/1962 | Dobrikin........................... | 285/69 |
| 3,052,489 | 9/1962 | Stoudt.............................. | 285/69 |

*Primary Examiner*—Thomas F. Callaghan
*Attorney, Agent, or Firm*—Frease & Bishop

[57] ABSTRACT

A coupling member for detachably connecting together two sections of air brake hose between vehicles. A coupling is comprised of two such similar coupling members, each of which has a hollow tubular body with one end attached to a section of hose. An arcuate flange extends circumferentially about the major portion of the tubular body and has an arcuate locking lug extending generally axially from the body flange opposite the hose. An L-shaped arcuate flange projects upwardly forwardly from the rear portion of the tubular body adjacent the attached hose section. A projecting lip formed on the locking lug engages a similar lip formed on the L-shaped arcuate flange of the other of the two coupling members to secure the members in coupled position. An annular gasket is mounted within the bore of the tubular body and forms an airtight seal with a similar gasket mounted on the other coupling member. A finger is pivotally mounted within a circumferentially extending recess formed in a lower portion of the body flange of at least one member, and pivots by gravity beyond the flange when the members are in coupled position, and is adapted to engage an edge of the L-shaped flange of the other member to prevent premature rotational uncoupling of the members.

8 Claims, 8 Drawing Figures

AIR BRAKE HOSE COUPLING MEMBER CONSTRUCTION

CROSS REFERENCE TO RELATED PATENTS

The invention involves improvements in the coupling member shown in Design Pat. No. 186,198, and in the coupling members produced by the method of U.S. Pat. No. 3,010,167.

BACKGROUND OF THE INVENTION

1. Field of the Invention

The invention relates to a coupling construction of two similar coupling members for detachably connecting the ends of air brake hoses for trucks or railroad cars to form an airtight connection. More particularly, the invention relates to an improved air brake hose coupling member construction having locking means preventing accidental rotational separation of a joined coupling.

2. Description of the Prior Art

Railroad cars and certain types of trucks having pneumatic brake systems use flexible air hoses which extend between separate railroad cars or portions of a tractor-trailer assembly for operation of the pneumatic brake system. A coupling member is attached to each end of the flexible hoses for detachably connecting the hose sections together when individual railroad cars are joined to form a unit train. These couplings are designed and manufactured to meet the requirements of the American Railroad Association or the trucking industry and are generally similar, so as to be compatible and interchangeable with those of other manufacturers.

These couplings are located between coupled railroad cars for joining together sections of air hose which extend from the braking system of each car. When coupled, the air pressure in the hose lines maintain the brakes of the individual cars in an "off" position. Thus, accidental separation of the coupling between two sections of air hose will apply the car brakes, resulting in stopping of a train with the subsequent delay, inconvenience and expense.

The couplings on many types of railroad cars are suspended between the cars and have a tendency to hang a short distance above the ground or railroad tracks, especially when the connecting hoses become worn and have less rigidity, permitting greater sag in the coupling. These couplings are joined together by a rotational downward motion which interengage mating flanges and lugs extending from the coupling members. Occasionally these members become uncoupled prematurely when struck by a raised object or the like lying between the railroad tracks which moves the coupled members upwardly, thus rotating the members in the uncoupling direction. This results in the undesirable stopping of the train.

Several types of locking devices have been devised for known coupling members to prevent such premature uncoupling. Some of the known locking devices use a spring detent or spring-biased member which requires depression or a separate manipulation upon coupling the members together, thus increasing the work and time for the coupling operation. Likewise, the spring becomes subject to wear and breakage, requiring repair and replacement.

Furthermore, the addition of these known locking devices increases considerably the cost of the coupling members due to the precision machining and milling steps necessary to form the various notches, grooves, etc., required to house the spring-biased mechanism to prevent affecting the close tolerances and specifications for such railroad couplings.

Thus, a need has existed for an improved air brake hose coupling member construction which enables rapid connection of hose sections in the heretofore usual manner without additional manipulations being required, which does not affect the usual axial separation and operation of such coupling members, and which prevents or considerably reduces premature uncoupling of the attached members.

SUMMARY OF THE INVENTION

Objectives of the invention include providing an improved air brake hose coupling member construction which meets the requirements of the American Railroad Association or trucking industry and which is compatible or interchangeable with existing coupling members being used; providing an improved air brake hose coupling member having a gravity-operated locking finger which prevents the premature rotational uncoupling of the joined coupling members when struck by a raised object in the railroad bed or the like, in which the locking finger is free of springs or other components subject to wear and repair, and in which the locking finger can be formed as a part of existing coupling member designs without appreciably affecting the manufacture thereof; providing an improved air brake hose coupling member construction having a locking finger which does not interfere with the usual rotational coupling procedure, and does not require separate manipulation of the locking finger when a pair of coupling members are joined, in which the locking finger automatically assumes a locking position when the coupling members are joined, and in which the locking finger is unaffected by minor manufacturing tolerances and variations of the coupling engaging flanges; providing an improved air brake hose coupling member construction which can be produced relatively inexpensively, with a minimum amount of precision machining required, which maintains the usual airtight connection and other advantages of existing coupling member constructions, which eliminates difficulties heretofore encountered with prior coupling members having locking devices, and which achieves the stated objectives simply and effectively, and solves problems and satisfies existing needs.

These objectives and advantages are obtained by the improved air brake hose coupling member construction of the type having generally tubular body means with a neck at one end adapted to be connected to an air hose, and with arcuate locking lug means projecting outwardly from the other end of the body means; in which L-shaped flange means is formed on the body means adjacent the neck and projects upwardly and forwardly therefrom; in which gasket means is mounted on the body means and projects outwardly from the body means; and in which the locking lug means and L-shaped flange means are adapted to engage L-shaped flange means and locking lug means, respectively, of another coupling member similar to the improved coupling member, to couple said members together when the members are placed in abutting relationship and rotated oppositely with respect to each other; the improvement including a circumferentially extending recess formed in the tubular body means, said recess being located adjacent to and below the locking lug when the member is oriented to coupled position; finger means having a swinging end and an opposite generally fixed end, said finger means conforming to the general shape and size of the recess; means pivotally mounting the finger means on the body means within the recess for movement of the finger means swinging end between retracted and extended positions into and out of said recess, respectively; the swinging end being located circumferentially adjacent the locking lug means, and the pivot means being located below said swinging end when said finger means is in retracted position whereby said finger means moves under the influence of gravity out of the recess to extended position; the tubular body means including arcuate circumferentially extending flange means projecting outwardly from the body, with the locking lug means being formed on the arcuate flange means; lip means projecting from the ends of the L-shaped bracket means and locking lug means adapted to interengage similar lip means formed on the opposite connecting member; and the gasket means being adapted to engage similar gasket means of the other connecting member under compression, when the members are in coupled position.

BRIEF DESCRIPTION OF THE DRAWINGS

A preferred embodiment of the invention - illustrative of the best mode in which applicant has contemplated applying the principles - is set forth in the following description and shown in the drawings and is particularly and distinctly pointed out and set forth in the appended claims.

Similar numerals refer to similar parts throughout the drawings.

DESCRIPTION OF THE PREFERRED EMBODIMENT

Figure 2:
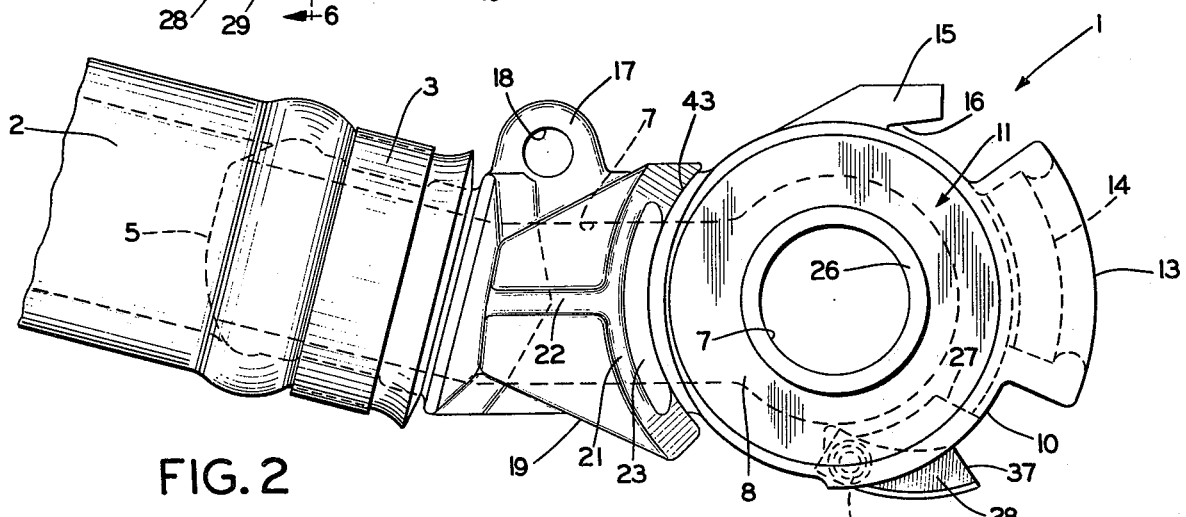
FIG. 2 is a side elevation of the outer side of the coupling member shown in FIG. 1.
Figure 3:
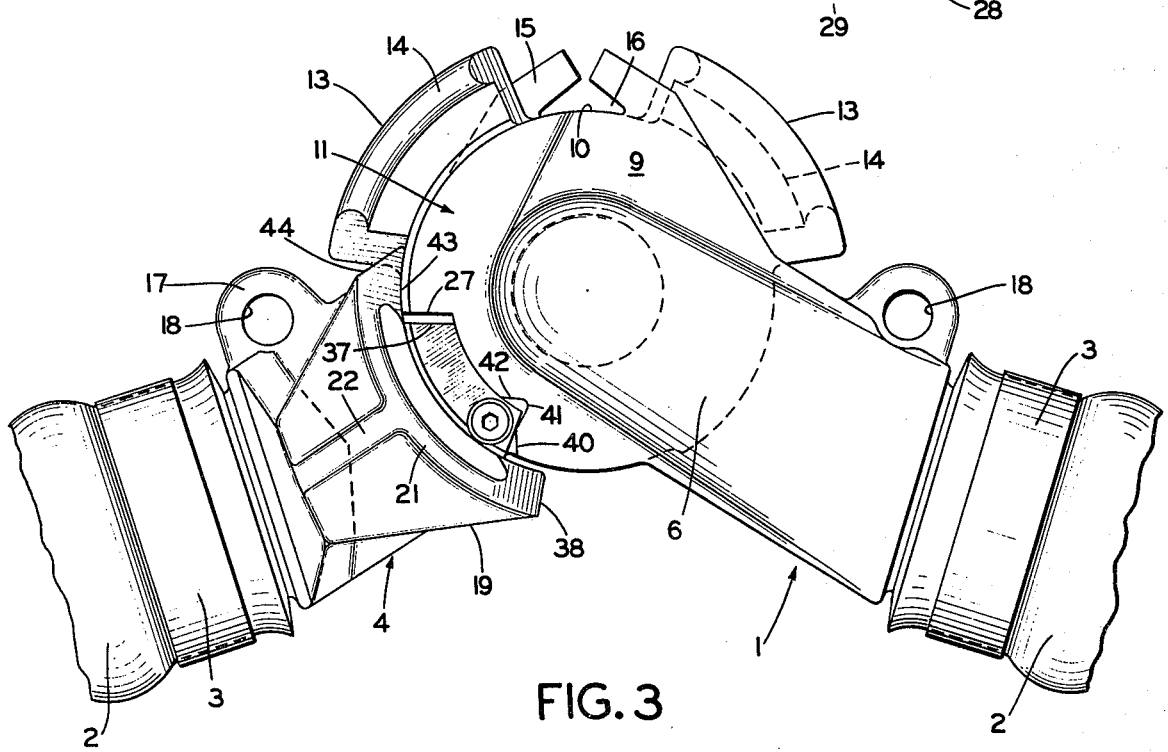
FIG. 3 is a side elevation of the improved coupling member of FIGS. 1 and 2 partially assembled with a similar coupling member, prior to their rotation into locked position.
Figure 4:
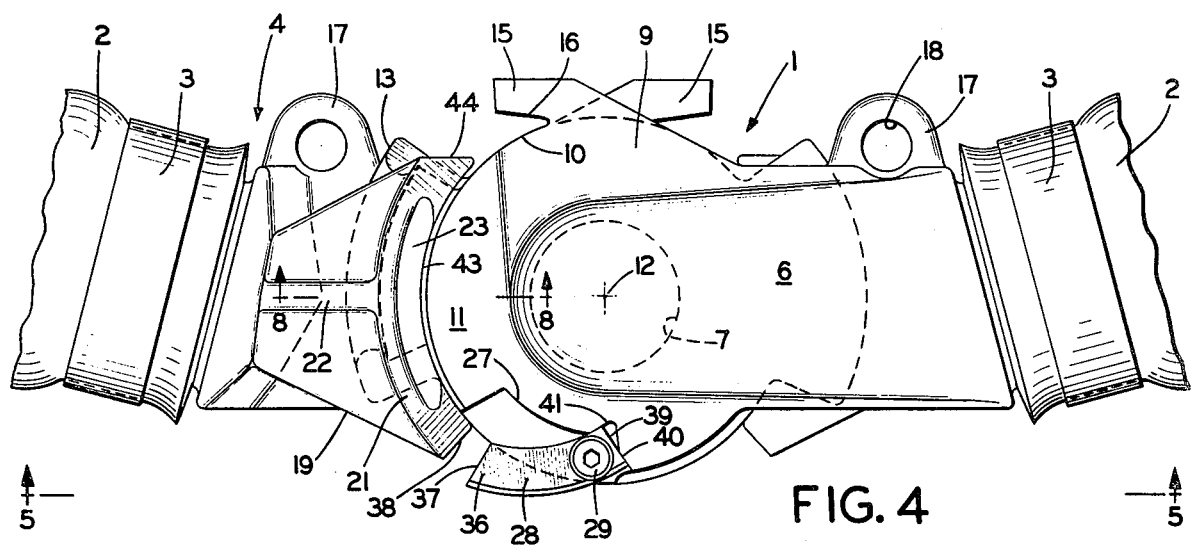
FIG. 4 is a side elevation similar to FIG. 3 with the pair of coupling members in engaged locked position.
Figure 5:
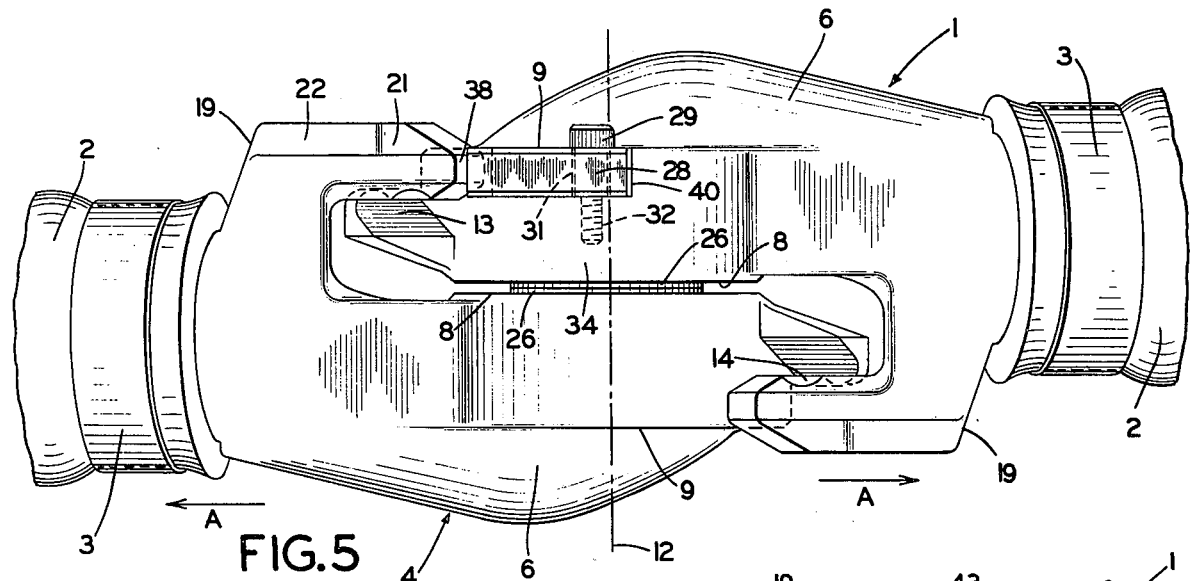
FIG. 5 is a bottom plan view looking in the direction of arrows 5—5, FIG. 4.

The improved air brake hose coupling member is generally indicated at 1 (FIGS. 1 and 2) and is shown connected to an end of a section of hose 2 by a banding strap 3. FIGS. 3, 4 and 5 show coupling 1 being engaged and coupled with a second coupling member 4 which preferably is identical to coupling 1, except it may not have the improved locking device described below as a part thereof.

Coupling member 1 has a tubular neck 5 which preferably is connected at an angle with a tubular body 6, the bore 7 of which terminates in an inner coupling face 8. Coupling face 8 (FIG. 2) is flat and has a circular configuration, the plane of which is disposed at a right angle with respect to the plane of the angle of neck 5 and generally is parallel with the axis of bore 7.

The outer surface of tubular body 6 (FIG. 1) terminates in an arcuate, generally circular surface 9 which is disposed opposite with respect to coupling face 8 and is connected thereto by a curved end surface 10. Coupling face 8, outer surface 9 and end surface 10 form an arcuate flange, generally indicated at 11, which projects outwardly from body 6 and extends in generally circular fashion. The center or axis of arcuate flange 11 is indicated by imaginary line 12 (FIG. 5) which coincides with the center of bore 7 at coupling face 8.

Figure 1:
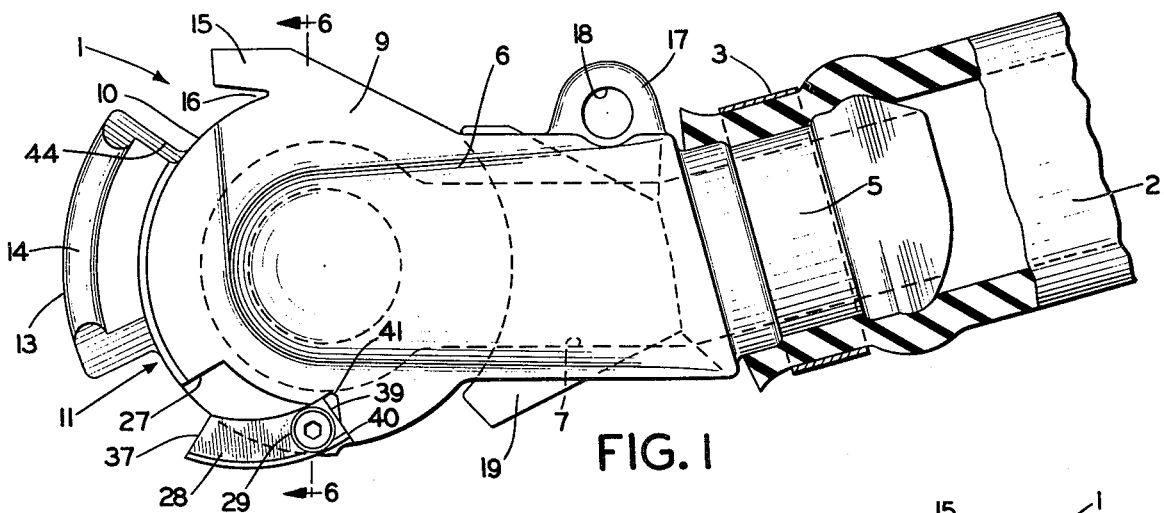
FIG. 1 is a side elevation with portions broken away and in section, of the inner side of the improved coupling member with the locking finger shown in extended position.
Figure 8:
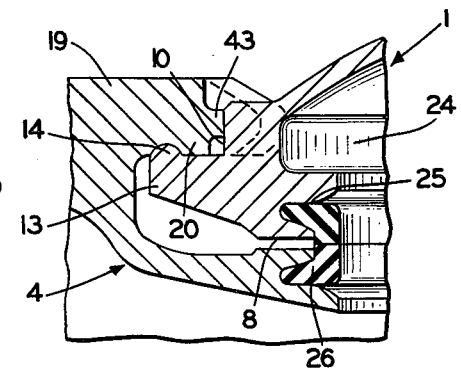
FIG. 8 is a fragmentary sectional view taken on line 8—8, FIG. 4.

Flange 11 includes an arcuate-shaped locking lug 13 which projects outwardly from end surface 10. Lug 13 is aligned generally opposite of bore 7 and terminates in a raised, rounded lip 14. Lip 14 projects outwardly from lug 13 in a direction away from coupling face 8 as shown in FIGS. 1, 2 and 8.

A stop member 15 is formed integrally with flange 11 and projects outwardly from the top portion thereof and forms a general V-shaped notch 16 with flange end surface 10. Stop 15 and notch 16 limit the rotational movement of coupling members 1 and 4 with respect to each other when rotated in a coupling direction, and is discussed more in detail below.

A boss 17 is formed on the top of body 6 adjacent the junction of flange 11 and neck 5, and is formed with an opening 18. Boss 17 and opening 18 permit a chain or other supporting device to be connected to coupling member 1, to positively support joined members 1 and 4 between a pair of railroad cars. Such additional supporting chains may become necessary when hose sections 2 lose stiffness and rigidity with age, causing coupling members 1 and 4 to hang close to the railroad tracks and ground.

An L-shaped angular flange 19 extends laterally and forwardly from neck 5 for cooperating with locking lub 13 of mating coupling member 4 and vice versa to couple members 1 and 4 together. Flange 19 includes a lip 20 which projects downwardly from the forward end of flange 19 toward coupling face 8, and interlocks with lip 14 of flange 11, as shown in FIG. 8. Flange 19 also has a lip or forward edge 43 which projects forwardly from the end of flange 19 and which abuts end surface 10 flange 11 of the opposite coupling member. Flange 19 likewise may be formed with numerous ribs 21 and 22, and cutaway areas 23 to provide the desired strength and weight for coupling members 1 and 4 (FIG. 2).

Figure 6:
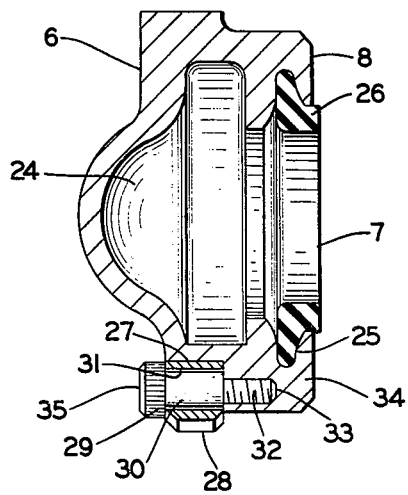
FIG. 6 is an enlarged fragmentary sectional view taken on line 6—6, FIG. 1.

Bore 7 of body 6 is flared outwardly upon merging with coupling face 8 as shown in FIG. 6, and forms an enlarged air chamber 24 within body 6. An annular, generally V-shaped recess 25 is formed in body 6 about bore 7, adjacent coupling face 8 for receiving a sealing gasket 26. Gasket 26, when seated in recess 25 extends outwardly beyond face 8 and engages and aligns with a corresponding gasket of coupling member 4, as shown in FIG. 5. Gaskets 26, thus when joined are held under compression and form an air passageway between coupling members 1 and 4, without requiring exact mating and matching of coupling faces 8.

In accordance with the invention an arcuate, circumferentially extending recess 27 is formed in body flange 11. Recess 27 is formed in the lower portion of flange 11 below and adjacent lug 13, when body 6 is oriented to the coupled position, as shown in FIGS. 1, 2 and 4. An arcuate-shaped finger 28 is pivotally mounted within recess 27 by a bolt 29. Finger 28 preferably has the same radius of curvature as end surface 10 of flange 11, so that finger 28 when in the retracted position will provide a generally smooth, continuous curved surface, as shown in FIG. 3, for engagement with L-shaped flange 19 of coupling member 4.

Bolt 29 (FIG. 6) preferably has a smooth cylindrical shaft portion 30 which is located within a hole 31 formed in the generally fixed end of finger 28, to pivotally mount finger 28 on flange 11. Shaft portion 30 terminates in a threaded portion 32 which is received in a tapped hole 33 in a thickened bottom wall section 34 of body 6. The outer end of bolt 29 has an enlarged head 35 which loosely clamps finger 28 in recess 27.

The front or swinging end 36 of finger 28 terminates in a flat surface 37. Surface 37 is adapted to engage the trailing edge 38 of flange 19 of the associated coupling member 4 to prevent premature uncoupling of the coupling members. The fixed end of finger 28 terminates in a flat surface 39 which abuts with a rear surface 40 of recess 27 to limit the downward swing of finger 28, as shown in FIGS. 1 and 4.

Figure 7:
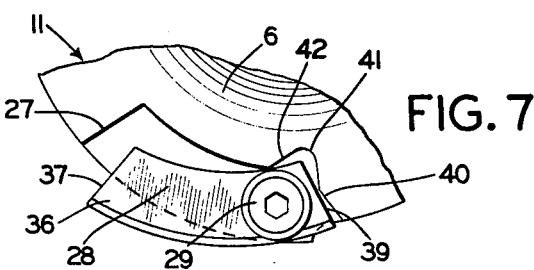
FIG. 7 is an enlarged fragmentary sectional view of the coupling member locking finger shown in an intermediate position.

A notch 41 is formed in recess 27 adjacent surface 40 into which the inner edge of finger 28 extends when finger 28 is in extended position. Surface 42 of notch 41 also serves as a stop along with recess surface 40 to limit the outward downward swing of finger 28. Finger 28 is shown in an intermediate position in FIG. 7 and illustrates the arrangement of stop surfaces 42 and 40 with respect to the relatively fixed end of finger 28 and surface 39 thereof.

Hose sections 2 extend outwardly from the ends of adjacent railroad cars and are connected to the appropriate air lines and associated brake equipment mounted on the cars. Coupling members 1 and 4 are located generally adjacent the mechanical coupler mechanism of the railroad cars so that a trainman can grasp easily members 1 and 4. Members 1 and 4 usually are supported by the stiffness of hose sections 2, unless a separate chain is connected to boss 17 to provide additional support.

In a usual air brake hose coupling procedure, a trainman will grasp members 1 and 4, one in each hand, and bend the hose upwardly. The coupling faces 8 of members 1 and 4 then are moved laterally and axially together bringing gaskets 26 into abutting relationship with respect to each other as shown in FIG. 3. Finger 28 will contact the forward edge 43 of L-shaped flange 19, when members 1 and 4 are moved together, automatically pivoting finger 28 from its extended position of FIG. 1 to the retracted position of FIG. 3. Thus, no separate manipulation or procedure is required by a trainman to operate finger 28 upon joining the coupling members as in some prior locking devices. Finger 28 will be held within recess 27 as shown in FIG. 3 when members 1 and 4 and gaskets 26 are in proper alignment prior to rotational locking of the members.

Members 1 and 4 then are rotated in opposite directions with respect to each other by the trainman upon the generally, downward outward movement of the members. Lips 14 and 20 of flanges 11 and 19 are interlocked with each other as shown in FIGS. 4, 5 and 8, and are held in engaged position by the force exerted by mating, compressed sealing gaskets 26. Gaskets 26 and lips 14 and 20 prevent the axial separation of members 1 and 4 when in coupled position, and will resist axial separation upon members 1 and 4 experiencing small forces applied axially on hose sections 2. Members 1 and 4 assume the locked or coupled position of FIG. 4, suspended between adjacent coupled railroad cars.

In further accordance with the invention, finger 28 will pivot automatically due to gravity from its retracted position within recess 27 (FIG. 3) in a generally outwardly radial direction with respect to curved end surface 10 to the extended, locked position of FIG. 4, as member 1 rotates in a counterclockwise direction and member 4 in a clockwise direction. Finger 28 will drop downwardly as soon as the trailing edge 38 of flange 19 rotates past swinging end 36 of finger 28. Members 1 and 4 are prevented from continued rotation in the locking direction after engagement of flanges 11 and 19 by the leading edges 44 of flanges 19 engaging stop member 15 within V-shaped notches 16.

Joined coupling members 1 and 4 remain in the position of FIG. 4 until rotationally uncoupled by a trainman, or by a sufficiently large force exerted in an axial direction to overcome the compressive force exerted by gaskets 26. It is the usual practice in uncoupling air brake hoses of railroad cars to first uncouple the mechanical coupler mechanism, and then by moving one of the cars away from the other car, a sufficiently large axial force is exerted on members 1 and 4 to overcome the compressive force of gaskets 26, whereupon members 1 and 4 separate or pull apart in an axial direction indicated by arrows A, FIG. 5. The generally rounded formation of interlocked lips 14 with lips 20, and the spacing between coupling faces 8 provided by abutting gaskets 26, permit faces 8 to move toward each other compressing gaskets 26, enabling lips 14 and 20 to become disengaged from each other. New locking finger 28, thus does not prevent or hinder in any way, such usual axial uncoupling procedure.

Finger 28 however, does prevent premature uncoupling of members 1 and 4 by accidental upward movement of the coupled members which rotates the members in an unlocking direction when the coupled members are struck by a raised object in the railroad track bed, such as snow, ice, etc., which heretofore has been a problem. When struck by such an object initiating unlocking rotation of the coupled members, swinging end face 37 of finger 28 engages trailing edge 38 of flange 19 (FIGS. 4 and 5), preventing continued rotation in the unlocking direction.

Conceivably the object upon striking the coupled members could also pivot finger 28 upwardly into retracted position within recess 27. However, the small width of finger 28 with respect to the exposed lower surfaces of bodies 6 as shown in FIG. 5 reduces considerably the possibility of such movement occurring simultaneously with the rotational movement of the coupled members.

The improved air brake hose coupling member construction, thus provides a new locking device which prevents or reduces considerably the premature rotational uncoupling of the coupled members, by providing a pivotally mounted finger which engages the coupling flange of the opposite coupling member; provides such a coupling member construction in which the locking finger is actuated by gravity automatically upon rotational movement of the coupling members into coupled position eliminating the need for a separate manipulation or operation by a trainman upon joining the air hose sections; provides a coupling member construction in which the locking finger does not interfere with the usual practice of axially separating the coupled members; provides a coupling member construction in which the locking finger eliminates the need for spring or other tensioning means for actuation of the locking means which are subject to frequent breakage and repair; provides a coupling member construction in which the locking finger can be incorporated easily into the existing types and styles of coupling members at little expense and which does not require critical machining and extremely close tolerances; and provides a coupling member construction which is effective, safe, inexpensive, and efficient in assembly, operation and use, and which achieves all the enumerated objectives, provides for eliminating difficulties encountered with prior devices, and solves problems and obtains new results in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved air brake hose coupling member construction is constructed, assembled and operated, the characteristics of the new construction, and the advantageous, new and useful results obtained; the new and useful structures, devices, elements, arrangements, parts, and combinations are set forth in the appended claims.

I claim:

1. An air brake hose coupling member construction of the type having generally tubular body means with a neck at one end adapted to be connected to an air hose, and with arcuate locking lug means projecting outwardly from the other end of the body means; the tubular body means having an outer surface, a coupling face and a curved end surface extending between said outer surface and coupling face; in which L-shaped flange means is formed on the body means adjacent the neck and projects upwardly and forwardly therefrom; and in which the locking lug means and L-shaped flange means are adapted to engage L-shaped flange means and locking lug means, respectively, of another coupling member similar to said coupling member, to couple said members together when the members are placed in abutting relationship and rotated oppositely with respect to each other; the improvement including a circumferentially extending recess formed in the curved end surface of the tubular body means, said recess being located adjacent to and below the locking lug means when the member is oriented to coupled position; rigid finger means having a swinging end and an opposite generally fixed end, said finger means conforming to the general shape and size of the recess; pin means pivotally mounting the finger means on the body means within the recess for movement of the finger means swinging end in a generally radial direction with respect to the tubular body means curved end surface between retracted and extended positions into and out of said recess, respectively; and the swinging end being located circumferentially adjacent the locking lug means, and the pivot pin means being located below said swinging end when said finger means is in retracted position whereby said finger means moves downwardly under the influence of gravity out of the recess to extended position.

2. The construction defined in claim 1 in which the tubular body means includes an arcuate flange extending outwardly from the body means and circumferentially about a major portion thereof; in which the arcuate flange includes the tubular body means curved end surface; and in which the recess is formed in said arcuate body flange.

3. The construction defined in claim 1 in which the tubular body means has an axially extending bore; and in which the coupling face lies in a plane generally parallel with the axis of the bore.

4. The construction defined in claim 3 in which the body means bore terminates at the coupling face; in which gasket means is mounted on the coupling face and surrounds the bore; and in which the gasket means projects outwardly beyond said coupling face.

5. An air brake hose coupling construction of the type including two similar coupling members; each member having a generally tubular body with a neck at one end adapted to be connected to an air hose, in which an arcuateshaped flange extends outwardly from the other end of the body, in which an L-shaped flange is formed on the body adjacent the neck and projects upwardly and forwardly toward the arcuate-shaped flange, and in which the arcuate flange has an arcuate locking lug projecting forwardly therefrom adapted for engaging the L-shaped flange on the other coupling member to connect said members together when the lug of each member is placed in circumferential relationship with respect to the L-shaped flange of the opposite member, and the members rotated oppositely with respect to each other; the improvement including a circumferentially extending recess formed in the arcuate body flange of one of the coupling members; said body flange recess being located adjacent to and below the locking lug of the coupling member when the member is oriented to coupled position; rigid finger means having a swinging end and a generally fixed opposite end; pin means pivotally mounting the finger means on the body arcuate flange within the recess for movement of the finger means swinging end in a generally radial direction with respect to the arcuate flange between retracted and extended positions into and out of said recess, respectively; the swinging end being located adjacent the locking lug and the pivot pin means being located rearwardly and lower than said swinging end, whereby said finger means moves under the influence of gravity downwardly outwardly of the recess to extended position; and the finger means swinging end aligning generally circumferentially with the L-shaped flange of the opposite coupling member when in extended position whereby the finger means is adapted to engage said opposite L-shaped flange preventing premature rotation of the coupling member in an uncoupling direction.

6. The construction defined in claim 5 in which the finger means swinging end terminates in a generally flat surface; in which the L-shaped flange of each coupling member has a trailing edge; and in which the finger means flat end surface is adapted to engage the L-shaped flange trailing edge of the other coupling member when the coupling members are rotated with respect to each other in an uncoupling direction.

7. The construction defined in claim 5 in which stop means are formed on the body flange adjacent the recess; and in which said stop means engages the finger means fixed end in extended position to limit the swing of the finger means in the extended position.

8. The construction defined in claim 5 in which the locking lug of each coupling member is located generally axially opposite the tubular neck on the body flange; in which the finger means is formed with an opening in the fixed end; in which the pivot pin means extends through said finger means opening to pivotally mount the finger means in the recess; and in which the pivot pin means is located on the body flange generally intermediate the locking lug and tubular neck.

* * * * *